United States Patent [19]
Yamada et al.

[11] 3,835,193
[45] Sept. 10, 1974

[54] PROCESS FOR PRODUCING ACROLEIN OR METHACROLEIN
[75] Inventors: Keisho Yamada; Sumio Umemura; Kyoji Odan; Mikio Hidaka; Kazuo Eukuda, all of Ube, Japan
[73] Assignee: UBE Industries Ltd., Yamaguchioken, Japan
[22] Filed: Dec. 1, 1970
[21] Appl. No.: 94,214

[30] Foreign Application Priority Data
Dec. 23, 1969  Japan.............................. 44-103003

[52] U.S. Cl............. 260/604 R, 252/467, 252/468, 252/469
[51] Int. Cl............................................ C07c 45/02
[58] Field of Search................. 260/604 R, 604 HX

[56] References Cited
UNITED STATES PATENTS
3,282,982  11/1966  Callahan et al................ 260/604 R
3,629,317  12/1971  Yamada et al................. 260/604 R FOREIGN PATENTS OR APPLICATIONS
4,313,963  6/1968  Japan.............................. 260/604 R
4,323,926  10/1968  Japan.............................. 260/604 R Primary Examiner—Howard T. Mars
Assistant Examiner—James H. Reamer
Attorney, Agent, or Firm—Robert E. Burns; Emmanuel J. Lobato; Bruce L. Adams

[57] ABSTRACT

A process for the production of acrolein or methacrolein in which propylene or isobutylene is contacted with oxygen or oxygen-containing gas in a vapor phase in the presence of a specified catalyst. The catalyst comprises (a) bismuth antimonate and (b) at least one molybdic acid salt of the following metals; barium, silver, zinc, cadmium, calcium and lead.

4 Claims, No Drawings

PROCESS FOR PRODUCING ACROLEIN OR METHACROLEIN

The invention relates to a process for producing acrolein or methacrolein from propylene or isobutylene. More particularly, it relates to a process for producing acrolein or methacrolein with high selectivity comprising contacting propylene or isobutylene with oxygen or oxygen-containing gas in a vapor phase in the presence of a novel catalyst.

Various oxidation catalysts have been heretofore proposed for use in a vapor phase catalytic oxidation of olefinically unsaturated hydrocarbons to produce corresponding unsaturated aldehydes with a view of enhancing selectivity for desired unsaturated hydrocarbon without reducing conversion of olefin raw material. The known oxidation catalysts include, for example, cuprous oxide, cupric oxide, bismuth molybdate or bismuth phospho molybdate, cobalt molybdate, antimony oxide, bismuth oxide, vanadium oxide and the like.

However, when propylene or isobutylene is catalytically oxidized into acrolein or methacrolein in the vapor phase in the presence of the known catalysts, substantial amounts of byproducts are inevitably formed such as carbon dioxide, carbon monoxide, saturated aldehydes, e.g. formaldehyde and acetaldehyde, and acids, e.g. acetic acid and acrylic acid, resulting in the reduction of selectivity for desired acrolein or methacrolein. Furthermore, expensive operations are required in order to remove such by-products and to obtain a highly purified product.

An object of the present invention is to provide a process of the vapor phase catalytic oxidation of propylene or isobutylene into acrolein or methacrolein with high yield, i.e. considerable reduction of such side-reactions as described above.

Another object of the present invention is to provide a catalyst with high selectivity for the vapor phase oxidation of propylene or isobutylene into acrolein or methacrolein.

Other objects and advantages will become apparent from the following description.

According to the present invention, a process for the production of acrolein or methacrolein which comprises contacting propylene or isobutylene in a vapor phase with oxygen or an oxygen-containing gas in the presence of a catalyst comprising (a) bismuth antimonate and (b) at least one member selected from the molybdic acid salts of metals consisting of barium, silver, zinc, cadmium, calcium and lead, is provided.

Propylene or isobutylene which is oxidized by the process of this invention need not necessarily be highly purified. A mixture of propylene and propane or a mixture of isobutylene and butane may also be used. However, any gas substantially exhibiting activity under the particular reaction conditions, for example, acetylene, n-butylene and the like, should preferably be excluded from the feed mixture since they may form undesirable by-products.

As a source of oxygen which is used in the catalytic oxidation of the invention, pure oxygen and any oxygen-containing gas may be used. Particularly, air may be advantageously used. A relative proportion of oxygen in a feed mixture is suitably from 0.8 to 3 moles, and preferably from about 1.0 to about 2.5 moles per mole of propylene or isobutylene. Feeding of oxygen in excess of the above limit inevitably leads to formation of side-products such as carbon monoxide and carbon dioxide. On the contrary, feeding of oxygen less than the above range brings about a reduction of selectivity of the desired product.

Furthermore, a diluent gas may be used in addition to propylene or isobutylene and oxygen. As diluent gas, the one which does not exert any substantial activity on the reaction, such as steam, nitrogen, carbon dioxide, ethane, propane, butane, isobutane and the like may be used. A relative proportion of diluent gas in a feed mixture is preferably more than 0.5 moles per mole of propylene or isobutylene. Steam in the reaction mixture not only acts as a diluent but also exhibits effects to enhance the selectivity of the catalyst for the formation of acrolein or methacrolein and to prolong the activity of the catalyst. Accordingly, it is generally preferred to add at least an equi-molar amount of steam to a feed mixture based on the olefin in the feed mixture.

The catalyst composition, which is used in the present invention, comprises the following two components; (a) bismuth antimonate and (b) at least one member selected from the molybdic acid salts of metals consisting of barium, silver, zinc, cadmium, calcium and lead.

As bismuth antimonate, various compounds expressed by the formulae; for example, $BiSbO_4$, $Bi(SbO_3)_3$ and $(BiO)_3SbO_4$ are intended. Bismuth antimonate, wherein atomic ratio of antimony and bismuth is 1 : 1, i.e. expressed by the formula $BiSbO_4$, is the most preferable. The molybdic acid salt of the particular metals also includes various compounds. Metal molybdates, which are most preferably employed in a process of the invention, are those expressed by the formulae; $BaMo_3O_{10}$, $BaMoO_4$, $Ag_2MoO_4$, $ZnMoO_4$, $CdMoO_4$, $CaMoO_4$, $CaMo_3O_{10}$ and $PbMoO_4$.

As an antimony source, which is used as starting raw material for preparing bismuth antimonate of the present invention, antimony chloride, antimony oxide, antimony hydroxide, antimony oxychloride and the like are, for example, enumerated. As a bismuth source, bismuth nitrate, bismuth chloride, bismuth carbonate, bismuth sulfate, bismuth oxide, bismuth oxychloride, bismuth hydroxide and the like are, for example, enumerated. In the preparation of bismuth antimonate, the above starting raw material may be used in the form of a solution in a suitable solvent, e.g. water, inorganic acid such as nitric acid and hydrochloric acid, and organic acids.

As a molybdenum source, which is used as starting raw material for preparing molybdates of barium, silver, zinc, cadmium, calcium and lead, for example, molybdic acid, ammonium molybdate, sodium molybdate, potassium molybdate and the like, are enumerated. As a barium, silver, zinc, cadmium, calcium or lead sources, nitrate, chloride, carbonate, sulfate, oxide, hydroxide, acetate and the like of the respective metals are useful. In the preparation of molybdate, the above starting raw material is also used in the form of, for example, a solution in a suitable solvent, e.g. water, inorganic acid such as nitric acid and hydrochloric acid, organic acid and aqueous ammonia.

A ratio of (a) bismuth antimonate to (b) metal molybdate in a catalyst is preferably from 95 : 5 to 20 : 80 [(a) : (b), by weight] and most preferably from 90 : 10 to 30 : 70. When a ratio of both components (a) and (b) is outside the above range, side-reactions occur and accordingly, the selectivity of the desired acrolein or methacrolein is somewhat reduced.

Preferred methods for preparing some of the catalyst components will be described for illustrative purposes:

a. Bismuth antimonate

Antimony trichloride is dissolved in a concentrated hydrochloric acid and water is added thereto to hydrolyze the salt and to form precipitates. To the mixture, aqueous ammonia is added to provide antimony oxide, to which a solution of bismuth nitrate in a diluted nitric acid is added. The resulting mixture is heated to dryness until the evolution of nitrogen dioxide has ceased and the solid is calcined to produce bismuth antimonate. By varying an atomic ratio of antimony and bismuth employed, various compounds expressed by the formulae; $BiSbO_4$, $Bi(SbO_3)_3$ and $(BiO)_3SbO_4$ will be produced. Bismuth antimonate ($BiSbO_4$) which is suitably employed in a process of the invention can be obtained by reacting both components in equi atomic ratio. However, a minor amount for instance up to about 10 percent by weight based on $BiSbO_4$ of $Bi(SbO_3)_3$ and/or $(BiO)_3SbO_4$ may be present in the bismuth antimonate to be used in a process of the invention.

b. Molybdic acid metal salt

A solution of nitric acid salt of the corresponding metal is added to solution of ammonium molybdate dissolved. The resultant mixture is heated to dryness until the evolution of nitrogen dioxide has ceased, and the solid is calcined to produce the corresponding metal salt of molybdic acid. By varying an atomic ratio of molybdenum and the particular metal, various compounds will be usually produced. Metal molybdates which are suitably employed in a process of the invention, i.e. those expressed by the formulae; $BaMo_3O_{10}$, $BaMoO_4$, $Ag_2MoO_4$, $ZnMoO_4$, $CdMoO_4$, $CaMoO_4$, $CaMo_3O_{10}$, and $PbMoO_4$ can be obtained by reacting both components in such a proportion wherein an atomic ratio of molybdenum to the particular metal corresponds to the atomic ratio of both metals in the desired molybdate as listed above. However, minor amounts for instance up to about 20% by weight based on $BaMo_3O_{10}$, $BaMoO_4$, $Ag_2MoO_4$, $ZnMoO_4$, $CdMoO_4$, $CaMoO_4$, $CaMo_3O_{10}$ or $PbMoO_4$, of molybdate, which can be obtained by reacting both components in such a proportion other than the above, i.e. those expressed by the formulae; for example, $Ag_2Mo_2O_7$ and $Pb_2O(MoO_4)$ may also be present in the metal molybdate to be suitably used in a process of the invention.

The catalyst may be used alone or in combination with any of the known carriers. As carriers, those which bring favorable effects for the reaction involved, such as silica, alumina, alumina-silica, silicate and the like which have been deactivated by, e.g. heat-treatment, may suitably be employed. These carriers may be used for example from 10 to 90 percent by weight of the catalyst.

The catalyst may be employed in either a fluidized bed or a fixed bed, although it is more advantageously used in a fixed bed since the life is extremely long.

Size and configuration of the catalyst grain are not critical but depend primarily on whether the catalyst is used in a fluidized bed or fixed bed. The catalyst may also be shaped or grained by suitable known methods in order to provide required mechanical strength.

The reaction is usually carried out under atmospheric pressure although slightly superatmospheric or slightly reduced pressures may be used if desired.

The reaction is suitably carried out at a temperature ranging between 300°C and 600°C, preferably between 350°C and 500°C. Reaction temperatures exceeding the above range cause the decomposition of propylene or isobutylene, the reduction of selectivity and the promotion of side-reactions.

A contact time of 0.5 to 40 seconds, especially 1 to 20 seconds, is preferred.

The invention will be further illustrated with reference to examples, in which "percent selectivity" and "percent conversion" are defined as follows:

$$\text{Percent selectivity} = \frac{\text{moles of the olefin converted from moles of the product}}{\text{moles of the olefin consumed}} \times 100$$

$$\text{Percent conversion} = \frac{\text{moles of the olefin consumed}}{\text{moles of the olefin supplied}} \times 100$$

and "percent" is percent by weight unless otherwise specified.

Selectivity and conversion of the main products, i.e. acrolein or methacrolein and acetaldehyde are shown in the examples, but those of the by-products, such as other aldehydes and acids, are omitted as negligible.

EXAMPLE 1

232 g of antimony trichloride ($SbCl_3$) was dissolved in 24 cc of concentrated hydrochloric acid. To the solution water was added to hydrolyze and to form precipitate and then, 76.7 cc of aqueous ammonia was added to obtain antimony oxide. The product was filtered and washed with water. The resultant product was placed in an evaporating dish and a solution of 492 g of bismuth nitrate [$Bi(NO_3)_3 \cdot 5H_2O$] dissolved in a mixture 92 cc of 62 percent nitric acid and 92 cc of water was added thereto and then, the mixture was heated to dryness until nitrogen dioxide gas had ceased to evolve. The solid was packed into a U-shaped stainless steel pipe, and calcined at 700°C for 16 hours by heating from outside while passing air through the pipe. Thus, bismuth antimonate, an atomic ratio of antimony and bismuth being 1 : 1, was obtained.

A solution of 218 g of barium nitrate [$Ba(NO_3)_2$] in 1,200 cc of water was added to a solution of 443 g of ammonium molybdate [$(NH_4)_6Mo_7O_{24} \cdot 4H_2O$] in 1,500 cc of water. The mixture was heated to dryness until nitrogen dioxide and ammonium nitrate had ceased to evolve. The solid was placed in a U-shaped stainless steel pipe and calcined at 540°C for 16 hours by heating from outside while passing air through the pipe at a flow rate of 100 cc/min. Thus, barium molybdate, an atomic ratio of molybdenum and barium being 3 : 1, was obtained.

The bismuth antimonate and the barium molybdate ($BaMo_3O_{10}$) so prepared were mixed together in a weight ratio of 50 : 50, and were kneaded in a mortar together with water to provide a paste. The paste was dried at 130°C for 16 hours and dressed to grain of 14 – 16 mesh (Tyler standard sieve), which was employed as a catalyst.

8 cc of the catalyst was packed into a U-shaped stainless steel reaction tube having an inner diameter of 6 mm. A gaseous mixture of propylene, steam and air, a molar ratio of the three components being 1 : 2 : 7.5, respectively, was passed through the reaction tube maintained at 470°C at a flow rate of 105 cc/min. The contact time was 4.57 seconds.

Conversion of propylene was 40.6 percent and selectivities of acrolein and acetaldehyde were 89.8 and 2.9 percent, respectively.

EXAMPLE 2

The same process as that of Example 1 was repeated except for using isobutylene as a starting raw material in place of propylene.

Conversion of isobutylene was 49.3 percent and selectivities of methacrolein and acetaldehyde were 87.7 and 3.2 percent.

EXAMPLES 3 – 6

With four kinds of catalysts, each containing bismuth antimonate and barium molybdate in varied mixing ratios (by weight), catalytic oxidation of propylene was carried out under the same conditions as those of Example 1. Results are shown in Table 1.

Table 1

| Example | Catalyst composition (%) | | Conversion of propylene (%) | Selectivity (%) | |
|---|---|---|---|---|---|
| | $BiSbO_4$ | $BaMo_3O_{10}$ | | Acrolein | Acetaldehyde |
| 3 | 30 | 70 | 49.2 | 86.3 | 2.8 |
| 4 | 40 | 60 | 44.6 | 87.2 | 2.9 |
| 5 | 60 | 40 | 39.2 | 91.4 | 3.4 |
| 6 | 70 | 30 | 38.4 | 88.6 | 2.9 |

EXAMPLE 7

The same process as that of Example 5 was repeated except for using isobutylene as a starting raw material in place of propylene.

Conversion of isobutylene was 46.2 percent and selectivities of methacrolein and acetaldehyde were 89.2 and 3.0 percent, respectively.

EXAMPLE 8

The same process as that of Example 5 was repeated except that a gaseous mixture of propylene, steam and air, a molar ratio of the three components being 1 : 2 : 7.5, respectively, was passed through the reaction tube maintained at 450°C at a flow rate of 80 cc/min and that the contact time was 6 seconds.

Conversion of propylene was 42.6 percent and selectivities of acrolein and acetaldehyde were 90.5 and 2.8 percent, respectively.

EXAMPLE 9

627 cc of 30 percent nitric acid was added to a solution of 94 g of ammonium molybdate [$(NH_4)_6Mo_7O_{24} \cdot 4H_2O$] in 627 cc of water. To the solution, a solution of 180 g of silver nitrate ($AgNO_3$) in 180 cc of water was added. The resultant mixture was placed in an evaporating dish and heated to dryness until nitrogen dioxide and ammonium nitrate had ceased to evolve. The solid was calcined in the same manner as that of the preparation of barium molybdate in Example 1. Thus, silver molybdate ($Ag_2MoO_4$) was obtained.

The silver molybdate so prepared and the bismuth antimonate prepared by the same method as that of Example 1 were mixed together in a weight ratio of 80 : 20, and kneaded in a mortar together with water to provide a paste. A catalyst was prepared from the paste in the same manner as that of Example 1.

Catalytic oxidation of propylene was carried out under the same conditions as those of Example 1 using the above catalyst except that a flow rate of gaseous mixture was 80.5 cc/min and that the contact time was 6.81 seconds.

Conversion of propylene was 43.2 percent and selectivities of acrolein and acetaldehyde were 80.7 and 3.5 percent, respectively.

EXAMPLES 10 – 13

Using four kinds of catalysts, each containing bismuth antimonate ($BiSbO_4$) and silver molybdate ($Ag_2MoO_4$) in varied mixing ratios (By weight), catalytic oxidation of propylene was carried out under the same conditions as those of Example 1. Results are shows in Table 2.

Table 2

| Example | Catalyst composition (%) | | Conversion of propylene (%) | Selectivity (%) | |
|---|---|---|---|---|---|
| | $BiSbO_4$ | $Ag_2MoO_4$ | | Acrolein | Acetaldehyde |
| 10 | 90 | 10 | 44.1 | 79.5 | 3.2 |
| 11 | 70 | 30 | 46.2 | 83.1 | 3.9 |
| 12 | 60 | 40 | 49.6 | 77.8 | 4.9 |
| 13 | 50 | 50 | 48.1 | 72.3 | 4.8 |

EXAMPLE 14

The same process as that of Example 9 was repeated except for using isobutylene as a starting raw material in place of propylene.

Conversion of isobutylene was 45.3 percent and selectivities of methacrolein and acetaldehyde were 80.1 and 4.5 percent, respectively.

EXAMPLES 15 – 19

The same process as that of Example 9 was repeated except that zinc molybdate ($ZnMoO_4$) was used in place of silver molybdate in the catalyst used in Example 9. Results are shown in Table 3.

The zinc molybdate ($ZnMoO_4$) was prepared as follows:

1,045 cc of 30 percent nitric acid was added to a solution of 157 g of ammonium molybdate [$(NH_4)_6Mo_7O_{24} \cdot 4H_2O$] in 1,045 cc of water. To the solution, a solution of 264 g of zinc nitrate [$Zn(NO_3)_2 \cdot 6H_2O$] in 260 cc of water was added. The resultant mixture was placed in an evaporating dish and heated to dryness until nitrogen dioxide and ammonium nitrate had ceased to evolve. The solid was calcined under the same conditions as those of the preparation of barium molybdate in Example 1. Thus, bismuth antimonate-zinc molybdate catalyst was obtained.

Table 3

| Example | Catalyst composition (%) | | Conversion of propylene (%) | Selectivity (%) | |
|---|---|---|---|---|---|
| | $BiSbO_4$ | $ZnMoO_4$ | | Acrolein | Acetaldehyde |
| 15 | 90 | 10 | 27.1 | 73.0 | 3.9 |
| 16 | 80 | 20 | 35.4 | 79.1 | 4.1 |
| 17 | 70 | 30 | 39.0 | 75.6 | 4.9 |
| 18 | 60 | 40 | 42.6 | 75.9 | 5.1 |
| 19 | 50 | 50 | 40.6 | 65.3 | 6.1 |

EXAMPLES 20 – 24

The same process as that of Example 9 was repeated except that isobutylene was used as a starting raw material in place of propylene and that barium molybdate ($BaMoO_4$) was used in place of silver molybdate in the catalyst in Example 9. Results are shown in Table 4.

The barium molybdate ($BaMoO_4$) was prepared as follows:

794 cc of 30 percent nitric acid was added to a solution of 119 g of ammonium molybdate $[(NH_4)_6Mo_7O_{24}·4H_2O]$ in 794 cc of water. To the resultant solution, a solution of 176 g of barium nitrate $[Ba(NO_3)_2]$ in 520 cc of water was added. The mixture was placed in an evaporating dish and heated to dryness until nitrogen dioxide and ammonium nitrate had ceased to evolve. The solid was calcined under the same conditions as those of the preparation of barium molybdate in Example 1. Thus, bismuth antimonate-barium molybdate catalyst was prepared.

Table 4

| Example | Catalyst composition (%) | | Conversion of isobutylene (%) | Selectivity (%) | |
|---|---|---|---|---|---|
| | $BiSbO_4$ | $BaMoO_4$ | | Meth-acrolein | Acet-aldehyde |
| 20 | 90 | 10 | 53.1 | 65.3 | 2.4 |
| 21 | 80 | 20 | 54.6 | 80.1 | 3.8 |
| 22 | 70 | 30 | 55.2 | 81.3 | 3.1 |
| 23 | 60 | 40 | 60.3 | 78.1 | 3.0 |
| 24 | 50 | 50 | 62.1 | 75.3 | 2.9 |

EXAMPLE 25

The same process as that of Example 22 was repeated except for using propylene as a starting raw material in place of isobutylene.

Conversion of propylene was 53.2 percent and selectivities of acrolein and acetaldehyde were 81.6 and 3.6 percent, respectively.

EXAMPLES 26 – 30

The same process as that of Example 9 was repeated except for using cadmium molybdate in place of silver molybdate of the catalyst in Example 9. Results are shown in Table 5.

The cadmium molybdate ($CdMoO_4$) was prepared as follows:

867 cc of 30 percent nitric acid was added to a solution of 130 g of ammonium molybdate $[(NH_4)_6Mo_7O_{24}·4H_2O]$ in 867 cc of water. To the resultant solution, a solution of 227 g of cadmium nitrate $[Cd(NO_3)_2·4H_2O]$ in 230 cc of water was added. The resultant mixture was placed in an evaporated dish and heated to dryness until nitrogen dioxide and ammonium nitrate had ceased to evolve. The solid was calcined under the same conditions as those of the preparation of barium molybdate in Example 1. Thus, bismuth antimonate-cadmium molybdate catalyst was prepared.

Table 5

| Example | Catalyst composition (%) | | Conversion of propylene (%) | Selectivity (%) | |
|---|---|---|---|---|---|
| | $BiSbO_4$ | $CdMoO_4$ | | Acrolein | Acetaldehyde |
| 26 | 90 | 10 | 46.0 | 70.5 | 6.2 |
| 27 | 80 | 20 | 52.3 | 77.1 | 5.4 |
| 28 | 70 | 30 | 62.0 | 78.5 | 5.1 |
| 29 | 60 | 40 | 57.5 | 74.4 | 5.6 |
| 30 | 50 | 50 | 54.3 | 60.3 | 6.2 |

EXAMPLE 31

The same process as that of Example 9 was repeated except that silver molybdate in the catalyst was replaced with calcium molybdate ($CaMoO_4$), a mixing ratio of the calcium molybdate and bismuth antimonate being 20 : 80 by weight and that catalytic oxidation was effected at a temperature of 450°C.

Conversion of propylene was 35.6 percent and selectivities of acrolein and acetaldehyde were 82.1 and 4.1 percent, respectively.

The calcium molybdate ($CaMoO_4$) was prepared as follows:

1180 cc of 30 percent nitric acid was added to a solution of 177 g of ammonium molybdate $[(NH_4)_6Mo_7O_{24}·4H_2O]$ in 1,180 cc of water. To the mixture, a solution of 236 g of calcium nitrate $[Ca(NO_3)_2·4H_2O]$ in 240 cc of water was added. The resultant mixture was placed in an evaporating dish and heated to dryness until nitrogen dioxide and ammonium nitrate had ceased to evolve. The solid was calcined under the same conditions as those of the preparation of barium molybdate in Example 1. Thus, bismuth antimonate-calcium molybdate catalyst was prepared.

EXAMPLE 32

The same process as that of Example 31 was repeated except for using isobutylene as a starting raw material in place of propylene.

Conversion of isobutylene was 38.3 percent and selectivities of methacrolein and acetaldehyde were 80.4 and 3.8 percent, respectively.

EXAMPLES 33 – 37

The same process as that of Example 9 was repeated except that lead molybdate ($PbMoO_4$) was used in place of silver molybdate in the catalyst of Example 9 and that catalytic oxidation of propylene was carried out by passing a gaseous mixture of propylene, steam and air, a molar ratio of the three components being 1 : 2 : 5, respectively, through the reaction tube at a flow rate of 80 cc/min, the contact time being 6 seconds. Results are shown in Table 6.

The lead molybdate ($PbMoO_4$) was prepared as follows:

642 cc of 30 percent nitric acid was added to a solution of 96.4 g of ammonium molybdate [$(NH_4)_6Mo_7O_{24}·4H_2O$] in 642 cc of water. To the mixture, a solution of 181 g of lead nitrate [$PB(NO_3)_2$] in 180 cc of water was added. The resultant mixture was placed on an evaporating dish and heated to dryness until nitrogen dioxide and ammonium nitrate had ceased to evolve. The product was calcined under the same conditions as those of the preparation of barium molybdate in Example 1. Thus, bismuth antimonate-lead molybdate catalyst was prepared.

g of bismuth nitrate [$Bi(NO_3)_3·5H_2O$] dissolved in a mixture 92 cc of 62 percent nitric acid and 92 cc of water was added thereto and then, the mixture was heated to dryness until nitrogen dioxide gas had ceased to evolve. The solid was packed into a U-shaped stainless steel pipe, and calcined at 700°C for 16 hours by heating from outside while passing air through the pipe. Thus, bismuth antimonate, an atomic ratio of antimony and bismuth being 1 : 1, was obtained.

A solution of 197 g of calcium nitrate [$Ca(NO_3)_2·4H_2O$] in 1,200 cc of water was added to a solution of 443 g of ammonium molybdate [$(NH_4)_6Mo_7O_{24}·4H_2O$] in 1500 cc of water. The mixture was heated to dryness until nitrogen dioxide and ammonium nitrate had ceased to evolve. The solid was placed in a U-shaped stainless steel pipe, and calcined at 540°C for 16 hours by heating from outside while passing air through the pipe at a flow rate of 100 cc/min. Thus, calcium molybdate, an atomic ratio of molybdenum and calcium being 3 : 1, was obtained.

The bismuth antimonate and the calcium molybdate ($CaMo_3O_{10}$) so prepared were mixed together in a weight ratio of 50 : 50, and were kneaded in a mortar together with water to provide a paste. The paste was dried at 130°C for 16 hours and dressed to grain of 14 to 20 mesh (Tyler standard sieve) which was employed as a catalyst.

8 cc of the catalyst was packed into a U-shaped stainless steel reaction tube having an inner diameter of 6 mm. A gaseous mixture of propylene, steam and air, a molar ratio of the three components being 1 : 2 : 7.5, respectively, was passed through the reaction tube maintained at 470°C at a flow rate of 105 cc/min. The contact time was 4.57 seconds.

Conversion of propylene was 45.3 percent and selectivities of acrolein and acetaldehyde were 91.3 and 2.0 percent, respectively.

Table 6

| Example | Catalyst composition (%) $BiSbO_4$ | $PbMoO_4$ | Conversion of propylene (%) | Selectivity (%) Acrolein | Acetaldehyde |
|---|---|---|---|---|---|
| 33 | 90 | 10 | 45.3 | 64.3 | 6.4 |
| 34 | 80 | 20 | 46.2 | 78.4 | 5.4 |
| 35 | 70 | 30 | 53.2 | 80.4 | 5.1 |
| 36 | 60 | 40 | 54.1 | 79.1 | 4.9 |
| 37 | 50 | 50 | 57.9 | 70.4 | 4.8 |

EXAMPLE 38

The same process as that of Example 35 was repeated except for using isobutylene as a starting raw material in place of propylene.

Conversion of isobutylene was 55.3 percent and selectivities of methacrolein and acetaldehyde were 81.3 and 6.0 percent, respectively.

EXAMPLE 39

232 g of antimony trichloride ($SbCl_3$) was dissolved in 24 cc of concentrated hydrochloric acid. To the solution water was added to hydrolyze and to make precipitate and then, 76.7 cc of aqueous ammonia was added to obtain antimony oxide. The product was filtered and washed with water. The resultant product was placed in an evaporating dish and a solution of 492

EXAMPLE 40

The same process as that of Example 1 was repeated except for using isobutylene as a starting raw material in place of propylene.

Conversion of isobutylene was 51.4 percent and selectivities of methacrolein and acetaldehyde were 87.3 and 3.1 percent.

EXAMPLES 41 – 44

With four kinds of catalysts, each containing bismuth antimonate and calcium molybdate ($CaMo_3O_{10}$) in varied mixing ratios (by weight), catalytic oxidation of propylene was effected under the same conditions as those of Example 1. Results are shown in Table 7.

Table 7

| Example | Catalyst composition (%) BiSbO$_4$ | CaMo$_3$O$_{10}$ | Conversion of propylene (%) | Selectivity (%) Acrolein | Acetaldehyde |
|---|---|---|---|---|---|
| 41 | 30 | 70 | 51.3 | 86.7 | 2.1 |
| 42 | 40 | 60 | 47.8 | 87.3 | 2.3 |
| 43 | 60 | 40 | 43.3 | 90.6 | 2.8 |
| 44 | 70 | 30 | 40.6 | 87.6 | 2.4 |

What is claimed is:

1. A process for the production of acrolein or methacrolein which comprises contacting, at a temperature substantially from 300° to 600°C, propylene or isobutylene in a vapor phase with oxygen or an oxygen-containing gas in the presence of a catalyst consisting essentially of (a) bismuth antimonate expressed by the formula BiSbO$_4$ and (b) at least one member selected from the molybdates expressed by the formula: BaMoO$_4$, BaMo$_3$O$_{10}$, Ag$_2$MoO$_4$, ZnMoO$_4$, CdMoO$_4$, CaMoO$_4$, CaMo$_3$O$_{10}$ and PbMoO$_4$, wherein the ratio by weight of (a) to (b) is within the range of 20 : 80 to 95 : 5.

2. A process for the production of acrolein or methacrolein as claimed in claim 1, wherein a mol ratio of said oxygen to said propylene or isobutylene is 0.8 to 3.0 times.

3. A process for the production of acrolein or methacrolein as claimed in claim 1, wherein said propylene or isobutylene is contacted with said oxygen or oxygen-containing gas together with a diluent gas selected from the group consisting of steam, nitrogen gas and carbon dioxide gas.

4. A process for the production of acrolein or methacrolein as claimed in claim 1, wherein said propylene or isobutylene in contacted with said oxygen or oxygen-containing gas for a period of 0.5 to 40 seconds.

* * * * *